UNITED STATES PATENT OFFICE 2,475,290

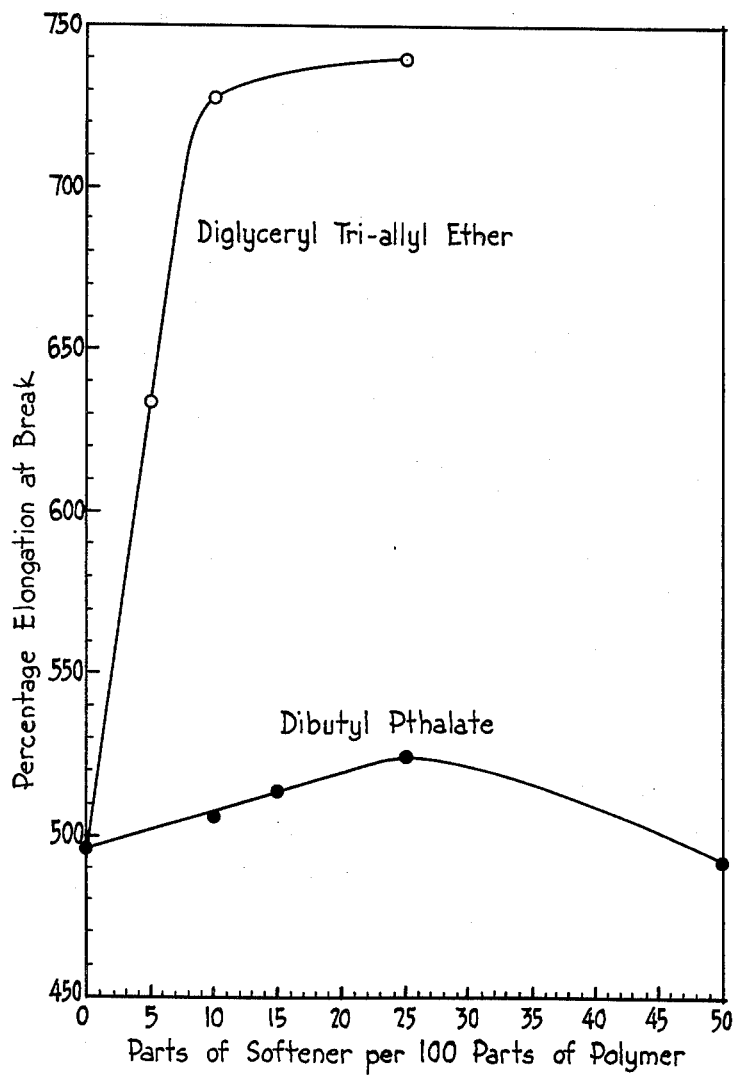

RUBBERLIKE POLYMER OF A DIENE HYDROCARBON PLASTICIZED WITH AN ALKENYL ETHER OF DIGLYCEROL

Kenneth E. Marple, Oakland, Calif., assignor to Shell Development Company, San Francisco, Calif., a corporation of Delaware Application September 14, 1945, Serial No. 616,337

12 Claims. (Cl. 260—33.2)

This invention relates to synthetic rubber compositions. More particularly, the invention pertains to compositions of improved properties comprising a rubber-like polymer of a diene hydrocarbon and an alkenyl ether of diglycerol as a softener therefor.

Unlike natural rubber, synthetic rubbers derived from diene hydrocarbons tend to be stiff and hard so that they require incorporation of some substance or substances as softeners in order that the vulcanizate will have properties required by the variety of uses to which synthetic rubbers are put. Since the softeners are additional materials which must be incorporated with the rubber-like polymers in compounding thereof, it is highly desirable that a minimum amount of softener be necessary to attain the desired effect. I have now discovered that a class of tri- and tetra-alkenyl ethers of diglycerol are exceptionaly efficient for the purpose of softening rubber-like polymers.

The tri- and tetra-alkenyl ethers of diglycerol employed in the compositions of my invention are readily prepared from derivatives of glycerol. The tri-alkenyl ethers are prepared by reacting a glyceryl di-alkenyl ether with a glycidyl mono-alkenyl ether (see U. S. Patent No. 2,314,039 for the latter class of compounds). The preparation of the tri-alkenyl ethers of diglycerol can be illustrated by the following method which was used to prepare diglyceryl tri-allyl ether A mixture of about 194 parts by weight of glycidyl allyl ether and 877 parts of glyceryl alpha,gamma-diallyl ether was cooled to —5° C. and 3.1 parts of stannic chloride was added to catalyze the reaction. The mixture was warmed slowly to 60° C. whereupon the temperature of the reaction mixture rose spontaneously to about 70° C. from the exothermic heat of reaction. When the temperature began to drop, heat was again applied and the reaction mixture was maintained at 80–90° C. for about 5½ hours. Potassium carbonate was added to neutralize the catalyst and the reaction mixture was filtered. Vacuum distillation of the mixture gave a yield of about 75.7% of diglyceryl tri-allyl ether which was a water-white, mobile liquid boiling at 126–127° C. at 1 mm. Hg pressure.

The tetra-alkenyl ethers of diglycerol are obtained by etherifying a tri-alkenyl ether of diglycerol with an alkenyl halide. The etherification can be effected in the usual manner with the aid of a base, or the alkali metal alcoholate of the diglyceryl tri-alkenyl ether can be formed and reacted with the alkenyl halide. The latter method was used to prepare the tetra-allyl ether of diglycerol in the following manner:

About 34.5 parts by weight of freshly cut, metallic sodium was added to about 433 parts of toluene. The toluene was refluxed with sufficient agitation by stirring to break up the molten sodium into small globules and about 458 parts of diglyceryl tri-allyl ether was added over the course of 1½ hours. The mixture was heated for another ¾ hour and allowed to stand overnight. To the resulting sodium salt or alcoholate, about 130 parts of allyl chloride was added over a 30 minute period. Precipitation of sodium chloride was rapid, but to insure maximum reaction, the mixture was heated for an additional hour before cooling and filtering. The toluene was separated by distillation at atmospheric pressure and the residue was flash distilled at 1–2 mm. Hg pressure from a Claisen flask. A cut boiling at 152–160° C., predominantly of the tetra-allyl ether, was redistilled from a vessel fitted with a fractionating column whereby a fraction boiling at 147° C. at 2 mm. to 127° C. at 0.8 mm. of Hg was obtained containing about 80% of the tetra-allyl ether with the remainder being tri-allyl ether. The overall conversion of diglyceryl tri-allyl ether to tetra-allyl ether was about 75%. The mixture of diglycerol ethers was a water-white, mobile liquid.

There are six possible structural isomers of a diglyceryl tri-alkenyl ether. The isomers can be illustrated by the following structural formulas wherein R represents an alkenyl radical:

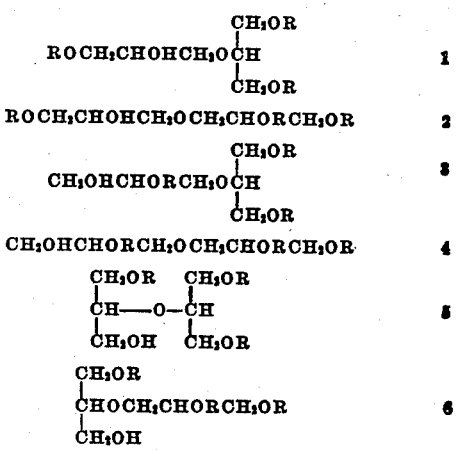

Of the foregoing structural isomers, isomer 1 is prepared by the method described in detail hereinbefore.

Isomer 2 is prepared by reacting glycidyl mono-alkenyl ether with alpha,beta-di-alkenyl glyceryl ether. The latter compound is prepared by reacting the sodium alcoholate of the unsaturated alcohol containing the appropriate alkenyl group with alpha,beta-dichlorhydrin of glycerol.

It is necessary in obtaining isomers 3 and 4 to first prepare the beta-mono-alkenyl ether of glycerol. The beta-compound can be obtained according to the methods described in U. S. Patent No. 2,038,705 with the exception that the appropriate alkenyl halide is used instead of the alkyl halide described therein. The monobromhydrin ether of the glyceryl alpha,gamma-di-alkenyl ether is prepared by reaction of the di-alkenyl ether with PBr₅ in the usual manner so as to substitute a bromine atom for the hydroxyl group of the ether. In like manner, the monobromhydrin of alpha,beta-di-alkenyl ether of glycerol needed to prepare isomer 4 can be obtained. The desired diglyceryl tri-alkenyl ether, isomer 3 or 4, can then be produced by reaction of the monobromhydrin ether with the half alcoholate of the beta-mono-alkenyl ether of glycerol, the latter compound being obtained by treating the beta mono-ether with half its equivalent of sodium in usual fashion.

Isomers 5 and 6 can be obtained by first reacting glycerol beta-monochlorhydrin with the sodium alcoholate of glycerol alpha,gamma-di-alkenyl ether or glyceryl alpha,beta-di-alkenyl ether. The diglyceryl ether obtained is then reacted with half of its equivalent of sodium to form the half alcoholate which is reacted with the alkenyl halide to introduce the third alkenyl group into the ether.

The corresponding tetra-alkenyl ethers of the various isomers can be obtained by treating the tri-alkenyl ethers with sodium and reacting the formed sodium alcoholate with the alkenyl halide in the manner described hereinbefore in detail.

Any of the various isomeric compounds can be used as softeners in the compositions of the invention. The various specific compounds described hereinafter for use in the compositions can be produced by the foregoing procedures.

The compounds employed as softeners in the compositions of the invention are ethers of diglycerol wherein the hydrogen atom of each of 3 to 4 hydroxyl groups have been replaced by an alken-2-yl radical of 3 to 12 carbon atoms. The unsaturated hydrocarbon substituents present in the diglycerol ethers have an olefinic double bond between two carbon atoms, one of which is linked directly to a saturated carbon atom which is linked directly to the ethereal oxygen atom. In other words, the substituent radical is a beta,gamma-monoolefinic aliphatic hydrocarbon radical having the olefinic bond between the carbon atoms which are in the beta and gamma positions with respect to the alpha carbon atom linked directly to the ethereal oxygen atom. While the substituent radicals are aliphatic in character, they can be either straight chain or branched chain radicals. The trialkenyl and tetra-alkenyl ethers of diglycerol can contain alkenyl radicals which are all alike, or two or more of the radicals can each be different. Preferably, the substituent alkenyl radicals contain 3 to 6 carbon atoms and diglyceryl tri-allyl ether is a most preferred compound. If desired, two or more different diglycerol ethers of the class can be employed as softener in the compositions.

Among typical tri-alkenyl ethers are diglyceryl tri-allyl ether, trimethallyl ether, tri-(methyl vinyl carbinyl) ether, tripenten-2-yl ether, trihexen-2-yl ether, tri-(methyl isobutenyl carbinyl) ether, triocten-2-yl ether, tridecen-2-yl ether, tridodecen-2-yl ether, allyl dimethallyl ether, allyl methallyl crotyl ether, etc. Representative tetra-alkenyl ethers include diglyceryl tetra-allyl ether, tetramethallyl ether, tetra-(2-ethyl propen-2-yl) ether, tetracrotyl ether, tetra-(methyl isobutenyl carbinyl) ether, tetrapenten-2-yl ether, tetrahexen-2-yl ether, tetraocten-2-yl ether, tetradecen-2-yl ether, tetradodecen-2-yl ether, diallyl dimethallyl ether, allyl tricrotyl ether, allyl methallyl dicrotyl ether, crotyl methallyl penten-2-yl dodecen-2-yl ether etc.

The polymer constituents which are softened by the ether in the compositions are rubber-like polymerizates of a 1,3-diene containing 4 to 6 carbon atoms such as butadiene-1,3, isoprene, pentadiene-1,3, hexadiene-1,3, hexadiene-2,4, 2-methyl pentadiene-1,3, 2-methyl pentadiene-2,4 and 2,3-dimethyl butadiene-1,3. Preferably copolymers of the 1,3-diene with one or more different compounds copolymerizable therewith containing the group

are used. The copolymers of different dienes are suitable as well as one or more dienes with one or more other unsaturated copolymerizable compounds such as chloroprene, acrylonitrile, styrene, isobutylene, methacrylonitrile, acrolein, methacrolein, methyl vinyl ketone, vinyl toluene, methyl methacrylate, methyl isopropenyl ketone, diallyl phthalate, allyl methacrylate, alpha-chloroacrylonitrile and the like. The rubber-like polymers and copolymers may be prepared in any of the well-known methods such as by use of sodium or boron tri-fluoride as catalysts, or by aqueous emulsion polymerization using organic peroxides or inorganic per-salts as catalysts. Particularly preferred rubber-like materials are copolymers of butadiene-1,3 with 15 to 50% acrylonitrile or styrene.

One of the purposes for which a softener is used in a synthetic rubber composition is to increase the ultimate elongation of the vulcanizate thereof. The extent to which the vulcanizate can be stretched is of prime importance in many applications thereof. In this respect, the unexpected superiority of the compositions of the invention attained by the use of the alkenyl ethers of diglycerol will be evident from consideration of this property in compositions containing diglycerol tri-allyl ether as softener and comparable compositions containing dibutyl phthalate which is a commonly used softener.

The polymer used in the compositions was a copolymer from about 60% butadiene-1,3 and 40% acrylonitrile known commercially as Hycar O. R. The compositions were prepared by compounding the ingredients indicated in the following formula in the order named with a heated roll mill:

| | Parts by weight |
|---|---|
| Rubber-like copolymer (Hycar O. R.) | 100 |
| Phenyl beta-naphthylamine | 1.0 |
| Benzothiazyl disulfide | 1.25 |
| Softener | Varied |
| Zinc oxide | 5.0 |
| Channel black | 50.0 |
| Stearic acid | 0.5 |
| Sulfur | 1.25 |

The compositions were prepared using varying amounts of the softeners and were vulcanized at 153° C. for 30 minutes. The ultimate elongation of the vulcanizates was determined according to the standard ASTM test. The composition containing no softener had an elongation at break of 496%. The percentage elongation of the vulcanizates containing the softeners are tabulated below:

| Parts Softener per 100 parts of Hycar O. R. | Dibutyl Phthalate | Diglyceryl Tri-Allyl Ether |
|---|---|---|
| 5 | ------- | 644 |
| 10 | 506 | 728 |
| 15 | 514 | ------- |
| 25 | 525 | 740 |
| 50 | 492 | ------- |

A plot of the foregoing results are given in the accompanying drawing. The plot shows that when dibutyl phthalate is used as softener, the elongation is increased gradually with increasing amounts of the ester, but that the elongation reaches a maximum at about 25 parts of ester per 100 parts of polymer and then decreases. The elongation of the vulcanizate containing diglyceryl tri-allyl ether increases sharply with increasing amounts of the ether. The tri-allyl ether is seen to be particularly efficient as a softener and only small amounts are needed to attain a desired softening action with increased elongation. The drawing shows that only about 1 part of diglyceryl tri-allyl ether per 100 parts of copolymer is needed to attain the maximum elongation possible with dibutyl phthalate which requires no less than about 25 parts of the dibutyl phthalate.

While high ultimate elongation is desired, it is also necessary that the vulcanizate have a good balance of other properties. The modulus of the vulcanizate at 300% elongation should not be unduly decreased by the presence of the softener. The abrasion, which is a measure of the wearing qualities, should be as low as possible and the stiffening temperature should be maintained low because the vulcanizate may be used where low temperatures are encountered. The hardness should be reduced to a medium value.

Another important factor in utilization of the softener in commercial practice is the length of time required to incorporate the softener during the compounding. It is desired naturally that this time be as short as possible for efficient compounding. The diglyceryl tri-alkenyl and tetra-alkenyl ethers are surprisingly outstanding in comparison to related compounds with respect to rate of incorporation. Compositions were prepared according to the aforementioned formula for purposes of comparisons on rate of incorporation as well as properties of the vulcanizates. The data on the rate of incorporation of the various softeners is collected in the table below. The compounding mill was operated under substantially identical conditions using the same quantity of polymer with about 0.1 inch clearance and the cooling water to the rolls at a temperature of 12 to 30° C. The softener in each case was added as rapidly as possible.

| Softener | Parts of Softener Per 100 parts Hycar O. R. | Time to Incorporate Softener, Minutes |
|---|---|---|
| Diglyceryl tri-allyl ether | 5 | 4½ |
| Do | 10 | 7 |
| Do | 25 | 11 |
| Dibutyl phthalate | 25 | 22 |
| Diglyceryl tri-isopropyl ether | 25 | 28 |
| Diglyceryl tri-(methyl isobutyl carbinyl) ether | 25 | 90 |
| Glyceryl di-isopropyl ether | 25 | 22 |

The foregoing table shows that the rate of incorporation of the alkenyl ethers is outstanding and that compounding is markedly facilitated by their use. The rate of incorporation of the diglyceryl trihexyl ether is seen to be very slow.

The compositions were vulcanized by heating at 153° C. for 30 minutes and the usual physical tests were run on the vulcanizates. The results are assembled in the following table:

| Softener | Parts of Softener per 100 parts of Hycar O. R. | Tensile Strength at Break, lbs. per sq. in. | Ultimate Elongation at Break, per cent | Modulus at 300% Elongation lbs. per sq. in. | Durometer Hardener, Shore Units | Abrasion, cc. per H. P. hr. | Stiffening Temp. ° C. |
|---|---|---|---|---|---|---|---|
| None | 0 | 4,308 | 490 | 2,260 | 71 | 35 | +1 |
| Diglyceryl tri-allyl ether | 5 | 3,824 | 644 | 1,160 | 62 | 18 | −10 |
| Diglyceryl tetra-allyl ether | 15 | 2,168 | 732 | 450 | 55 | 86 | −20 |
| Diglyceryl tri-isopropyl ether | 25 | 3,240 | 600 | 1,050 | 52 | 82 | −15 |
| Diglyceryl tri-(methyl isobutyl carbinyl) ether | 25 | 1,944 | 430 | 1,150 | 58 | 63 | −4 |
| Glyceryl di-isopropyl ether | 25 | 3,390 | 515 | 1,390 | 62 | 63 | −10 |
| Glyceryl di-(methyl isobutyl carbinyl) ether | 25 | 3,270 | 574 | 1,070 | 55 | | |

The above table indicates the very powerful softening action of the alkenyl ethers of diglycerol in comparison with closely related saturated ethers. The composition containing the diglyceryl tetra-allyl ether is indicated as containing too large an amount of this ether since while the ultimate elongation was markedly increased, the modulus was too low and the abrasion was too high for optimum properties. About 5 to 10 parts of the ether would have given a more satisfactory composition. The diglyceryl trihexyl ether, even in an amount of 25 parts, actually decreased the ultimate elongation. The diglyceryl tri-isopropyl ether gave improvement in elongation, although 25 parts were required, and the vulcanizate had a very high abrasion which indicates poor wearing qualities. In addition, it was found that the tri-isopropyl ether exuded or bled from the vulcanizate to some extent while the trihexyl ether gave a vulcanizate which bled rather heavily. The tendency of these saturated ethers to bleed from the vulcanizate makes them unsuitable as softeners. The glyceryl di-isopropyl ether was so volatile that considerable amounts were lost in the milling operation. Both of the glyceryl di-ethers are markedly inferior to the allyl diglyceryl ethers in softening action since 25 parts were required to give vulcanizates with increased elongation at satisfactory modulus.

Other softeners can be used in combination with the tri-alkenyl or tetra-alkenyl ethers of diglycerol in the compositions of the invention. For this purpose, there can be used such substances as high boiling coal tar oils, aromatic extracts of petroleum (Dutrex), sulfuric acid extracts of petroleum (Naftolens), alkylated phenols, dibutyl phthalate, diamyl naphthalene, tricresyl phosphate, dibutyl sebacate, tributoxyethyl phosphate and the like.

The proportion of the diglyceryl ethers may vary considerably in the compositions, depending to a large extent upon the particular substances contained therein and the use to which the composition is put. Ordinarily, about 5 to 25 parts of the alkenyl ether per 100 parts of polymer by weight are used, although in special cases a greater or lesser proportion is employed. In general, the larger the proportion of ether, the more tacky and plastic is the composition, and also the greater the elongation of the vulcanizate therefrom.

The diglyceryl tri-ether or tetra-ether softener is incorporated into the polymer by milling, preferably with a friction roll mill. The incorporation is effected with the mills maintained at lower temperatures than are ordinarily employed in milling natural rubber. Temperatures not higher than about 50° C. are to be recommended for the rolls in preparing the compositions.

While the foregoing description has emphasized the ether softener and the rubber-like polymer in the compositions, the presence of various other ingredients are necessary and desirable. Thus, in preparing a composition for processing or vulcanizing to a finished rubber article, a number of substances are also incorporated into the composition. The composition may contain an anti-oxidant or age-retarder, such as, for example, an amino compound like phenyl-beta-naphthylamine or ketone-amine reaction products. An organic vulcanization accelerator is incorporated like benzothiazyl disulfide, tetramethyl thiuram disulfide, mercapto benzothiazol, etc., together with an activator for the accelerator such as zinc oxide. Various powdered materials may be employed as fillers and reinforcers such as channel black, soft blacks, fine size whitings and clays, light calcined magnesia, and fillers which are essentially inert such as barytes and lithopones. In order that vulcanization will occur, the composition should contain sulfur or sulfur-liberating compounds. Certain other ingredients are also useful in very minor amounts such as stearic or lauric acid and waxes, both paraffinic and natural. The incorporation of these various substances is effected by milling.

The compositions containing the various ingredients such as the softener, sulfur, accelerator, age retarder, etc., are useful as compounded rubber-like materials which may be vulcanized. The vulcanization of the compounded compositions is effected in the usual well-known manner by application of heat and pressure. In this manner a great number of useful articles may be prepared.

This application is a continuation-in-part of my copending application, Serial No. 464,290, filed November 2, 1942, now abandoned.

I claim as my invention:

1. A composition of matter comprising a rubber-like polymer of a 1,3-diene aliphatic hydrocarbon of 4 to 6 carbon atoms and a softening agent therefor comprising an ether of diglycerol wherein the hydrogen atom of 3 to 4 hydroxyl groups in diglycerol have each been replaced with a beta,gamma-monoolefinic monovalent aliphatic hydrocarbon radical containing 3 to 12 carbon atoms, said ether being present in an amount of about 1 to 25 parts by weight per 100 parts of said polymer.

2. A composition of matter comprising a vulcanizate with sulfur of the composition as claimed in claim 1.

3. A composition of matter comprising a rubber-like copolymer of a 1,3-diene aliphatic hydrocarbon of 4 to 6 carbon atoms, with one other compound copolymerizable therewith containing a

group and a softener therefor comprising diglyceryl polyalken-2-yl ether containing 3 to 4 alkenyl groups having 3 to 6 carbon atoms each, said ether being present in an amount of about 5 to 25 parts by weight per 100 parts of said copolymer.

4. A composition of matter comprising a vulcanizate with sulfur of the composition as claimed in claim 3.

5. A composition of matter comprising a rubber like copolymer from a mixture comprising butadiene-1,3 and acrylonitrile and, as a softening agent therefor, diglyceryl tri-alken-2-yl ether wherein the alkenyl groups contain 3 to 12 carbon atoms, said ether being present in an amount of about 5 to 25 parts by weight per 100 parts of said copolymer.

6. A composition of matter comprising a vulcanizate with sulfur of the composition as claimed in claim 5.

7. A composition of matter comprising a rubber-like copolymer from a mixture comprising butadiene-1,3 and acrylonitrile and, as a softener therefor, diglyceryl tri-allyl ether, said ether being present in an amount of about 5 to 25 parts by weight per 100 parts of said copolymer.

8. A composition of matter comprising a vulcanizate with sulfur of the composition as claimed in claim 7.

9. A composition of matter comprising a rubber-like copolymer from a mixture comprising butadiene-1,3 and styrene and, as a softener therefor, diglyceryl tri-allyl ether, said ether being present in an amount of about 5 to 25 parts by weight per 100 parts of said copolymer.

10. A composition of matter comprising a vulcanizate with sulfur of the composition as claimed in claim 9.

11. A composition of matter comprising a rubber-like copolymer of butadiene-1,3 with another compound copolymerizable therewith containing a

group and, as a softener therefor, diglyceryl tetra-allyl ether, said ether being present in an amount of about 5 to 25 parts by weight per 100 parts of said copolymer.

12. A vulcanizate with sulfur of the composition as claimed in claim 11.

KENNETH E. MARPLE.

REFERENCES CITED

The following references are of record in the file of this patent:

UNITED STATES PATENTS

| Number | Name | Date |
|---|---|---|
| 2,197,467 | Evans | Apr. 16, 1940 |
| 2,234,204 | Starkweather | Mar. 11, 1941 |
| 2,258,892 | Harris | Oct. 14, 1941 |